United States Patent [19]

McMurray

[11] 3,882,370

[45] May 6, 1975

[54] CONTROL OF POWER CONVERTERS HAVING A PARALLEL RESONANT COMMUTATION CIRCUIT

[75] Inventor: William McMurray, Schenectady, N.Y.

[73] Assignee: General Electric Company, Schenectady, N.Y.

[22] Filed: Nov. 15, 1973

[21] Appl. No.: 416,006

[52] U.S. Cl.................. 321/45 R; 321/69; 323/119
[51] Int. Cl. ........................................... H02m 7/52
[58] Field of Search........ 321/6, 43, 44, 45 R, 45 C, 321/45 ER, 66, 69, 7; 219/10.77; 331/113 S; 323/102, 119

[56] References Cited
UNITED STATES PATENTS

| | | | |
|---|---|---|---|
| 3,319,147 | 5/1967 | Mapham | 321/45 R |
| 3,448,368 | 6/1969 | Brouwer | 321/45 R |
| 3,466,525 | 9/1969 | Ainsworth | 321/38 |
| 3,566,148 | 2/1971 | Wood | 321/45 R |
| 3,718,852 | 2/1973 | Bailey | 319/10.77 |

FOREIGN PATENTS OR APPLICATIONS

| | | | |
|---|---|---|---|
| 261,066 | 4/1968 | Austria | 321/45 R |
| 1,113,013 | 5/1968 | United Kingdom | 321/45 C |

*Primary Examiner*—William H. Beha, Jr.
*Attorney, Agent, or Firm*—Donald R. Campbell; Joseph T. Cohen; Jerome C. Squillaro

[57] ABSTRACT

In a variable operating frequency inverter or other converter with a parallel resonant commutation circuit, the frequency changes with the load to control the reactive power available for commutation of the thyristors or other controlled power devices. A constant turn-off time control circuit automatically adjusts the operating frequency so that the reactive power for commutation is optimum and reliability is improved. The control circuit and method utilizes sensed instantaneous power circuit parameters from which the future state of the commutating capacitor voltage can be predicted, and a computation circuit for determining the timing of firing signals to provide an approximately constant turn-off time for a conducting device.

23 Claims, 9 Drawing Figures

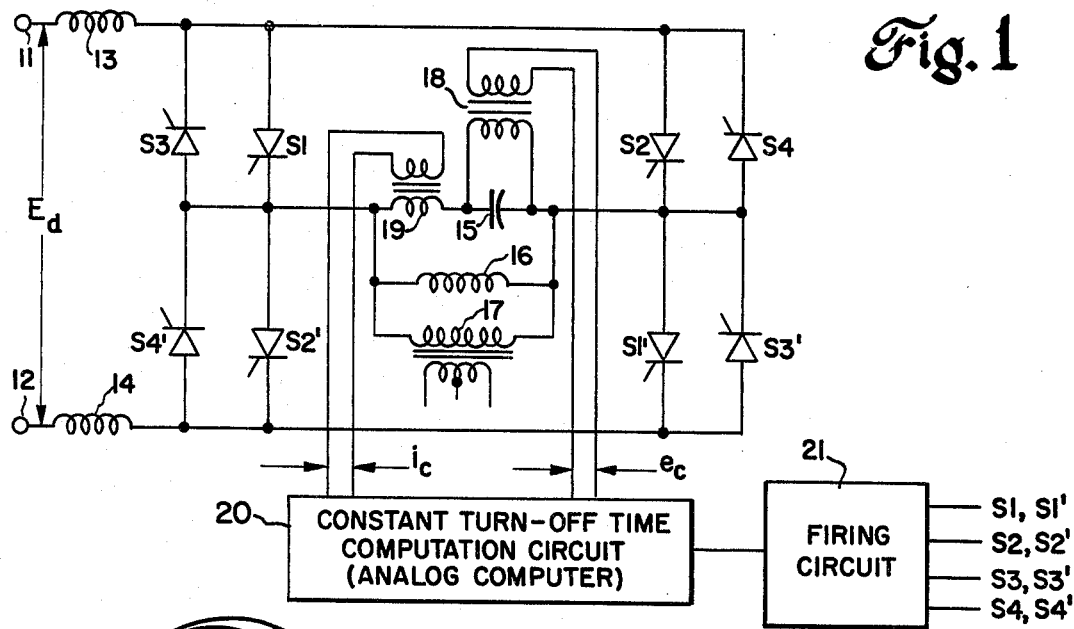
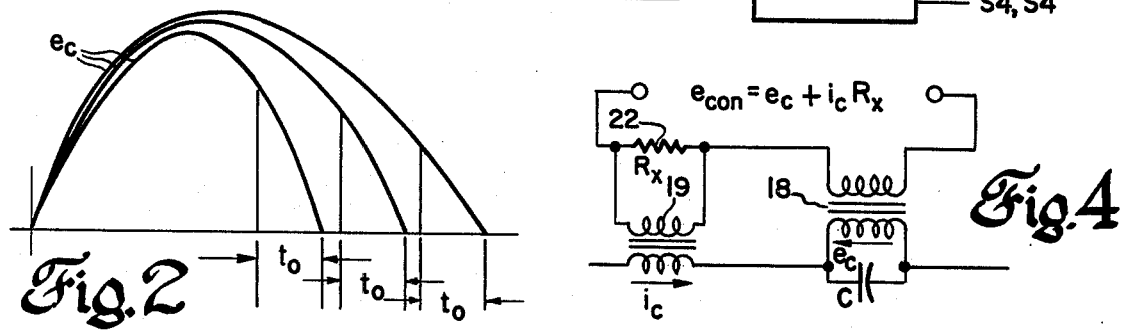
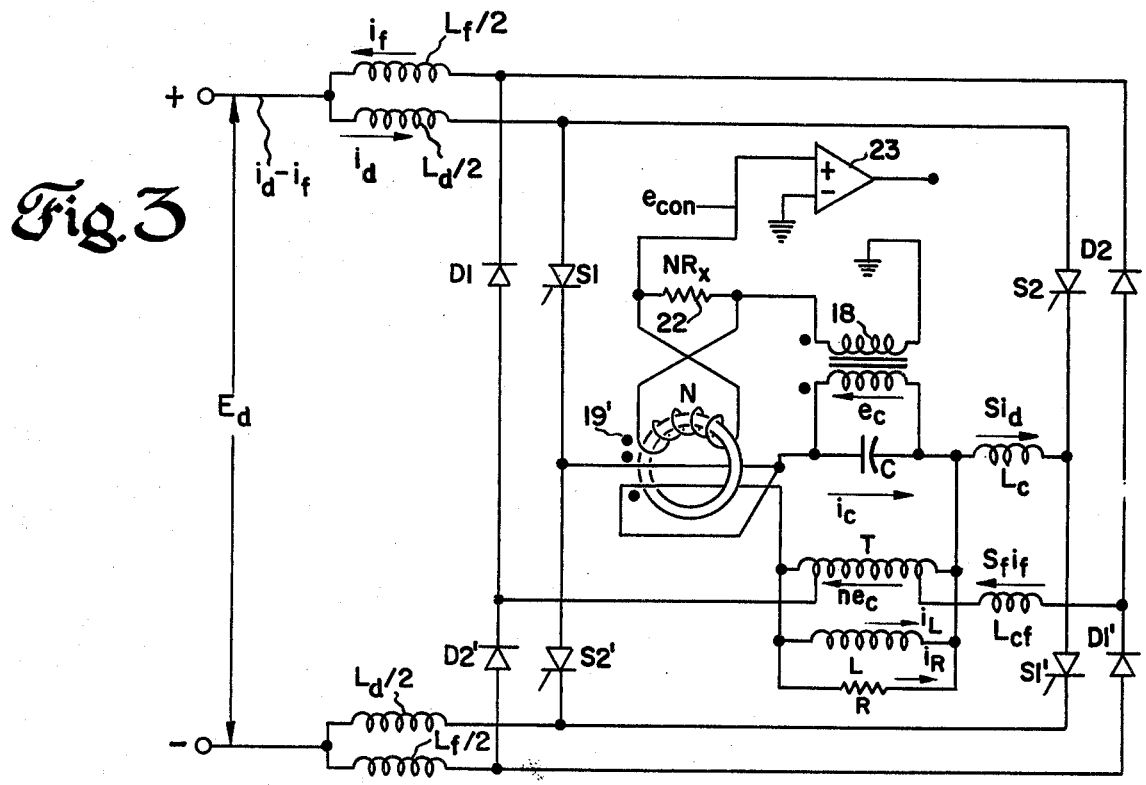

CONTROL OF POWER CONVERTERS HAVING A PARALLEL RESONANT COMMUTATION CIRCUIT

BACKGROUND OF THE INVENTION

This invention relates to a control circuit and method for controlling inverters and other converters which have a parallel resonant commutation circuit and a variable operating frequency dependent on the load. This control technique automatically adjusts the frequency for most efficient operation by maintaining a constant turn-off time for the converter thyristors or other power devices.

In U.S. Pat. No. 3,742,336 to B. D. Bedford, granted June 26, 1973 and assigned to the same assignee, there is described a solid state power conversion system comprised by a high frequency inverter that feeds a cycloconverter and supplies adjustable voltage and frequency to an inductive load, such as an ac motor. Variable commutation energy is provided by a parallel resonant circuit operated above its resonant frequency. The amount of commutating energy is controlled by adjusting the inverter operating frequency and increases as the frequency is increased, since the capacitor power increases while the inductor power decreases as the frequency is raised. For light loads the operating frequency is just above the resonant frequency, while for heavy loads the operating frequency is increased so that there is a higher capacitor voltage for commutation. These systems are also constructed with an input cycloconverter operated in the regenerative mode, and other variations are discussed in the Bedford patent.

Variable frequency inverters, typically in the full bridge configuration, have also been used for induction heating and other applications to supply high frequency power to a load where the exact value of the frequency is not critical. Different control methods for such circuits have been described in the prior art. One control technique assumes the capacitor voltage will be approximately sinusoidal and attempts to maintain a constant phase angle margin. Thus, at the lower end of the frequency range the turn-off is longer than necessary. Another scheme uses a phase-locked loop in which a signal proportional to the phase lead angle is fed back to a voltage-controlled oscillator. A constant margin angle is maintained instead of actual margin time and is, furthermore, slow in response. While response time is not critical for induction heating, where the load changes slowly, it is important when the load is a cycloconverter that can switch rapidly.

The present invention is directed to an improved control technique for variable frequency inverters and converters which must be properly controlled as the load impedance varies in order to avoid wide fluctuations in the output voltage and commutation failure. Sudden load changes can cause severe voltage transients or result in failures. For reliable operation, a considerable safety factor for the turn-off time may be necessary and performance is not optimum. It is desirable for most efficient operation that the net reactive power of the parallel resonant commutation circuit exceeds that required by the load by just the amount necessary to provide commutation for the power devices. In the cycloconverter systems, the new control method is adapted to accommodate rapid reversals of load current caused by switching of the cycloconverter thyristors. The extension of the basic technique here taught to the derivation of firing limit signals for high frequency link cycloconverters, with the additions to accommodate the change in load current when a device is switched, is given in application Ser. No. 419,490 filed on Nov. 28, 1973 by the same inventor entitled "Control of Cycloconverter Systems Having a Parallel Resonant Commutation Circuit," and assigned to the same assignee.

SUMMARY OF THE INVENTION

In accordance with the invention, the operating frequency of an inverter or other power converter with a parallel resonant commutation circuit, which typically operates at a high frequency, is automatically adjusted by providing a constant turn-off time for the thyristors or other controlled power devices iregardless of the magnitude of the load being supplied. These converters utilize a parallel capacitor commutation mechanism in which an incoming power device is fired in order to commutate off an outgoing device, and the rate of change of the commutating capacitor voltage increases as the load increases. The constant turn-off time control circuit in effect computes the future state of the power circuit and, in each half cycle, times the generation of the firing signal for an incoming device which results in an approximately constant turn-off time for an outgoing device. The control circuit broadly includes sensing means for sensing selected power circuit parameters from which the future state of the voltage of the parallel commutating capacitor or capacitor means can be predicted. Computation means utilizes the sensed parameters to derive a cyclically varying control signal which preferably has an initial zero-crossing in each half cycle at which an output signal is produced for timing the production of the firing signal. The output signal is generated when the predicted time to passage through zero of the commutating capacitor voltage is approximately equal to the predetermined constant turn-off time including some safety margin.

The sensing and computation means in the preferred forms are provided by a simple potential transformer for the capacitor voltage, one or more current transformers for selected power circuit currents, a burden resistor for the current transformer, and a comparator for producing an output signal when the control signal generated by the foregoing arrangement is equal to a reference, preferably a zero voltage level. Several sensing device configurations are disclosed. It is shown that simply adjusting the value of the burden resistor compensates for the inclusion of series current-limiting commutating inductance in the power circuit that results in an overlap of device conduction. Usually a time delay lockout is provided to prevent spurious output signals due to multiple zero-crossings of the control signal. A control method for these inverters and converters is in accordance with the foregoing discussion and circuitry.

BRIEF DESCRIPTION OF THE DRAWINGS

FIG. 1 is a schematic circuit diagram of a full bridge variable frequency converter including a constant turn-off time control circuit constructed in accordance with the invention to supply output signals to the firing circuit for the thyristor power devices;

FIG. 2 illustrates schematically the commutating capacitor voltage waveforms under different load conditions and the operation of the constant turn-off time control technique to adjust the operating frequency;

FIG. 3 is a detailed schematic circuit diagram of a preferred embodiment of the inverter power circuit and constant turn-off time computation circuit including the sensors for continuously sensing the commutating capacitor voltage and other required power currents;

FIG. 4 is a schematic diagram of the preferred sensing devices and simplified computation circuit similar to that shown in FIG. 3;

DESCRIPTION OF THE PREFERRED EMBODIMENTS

Figure 5:
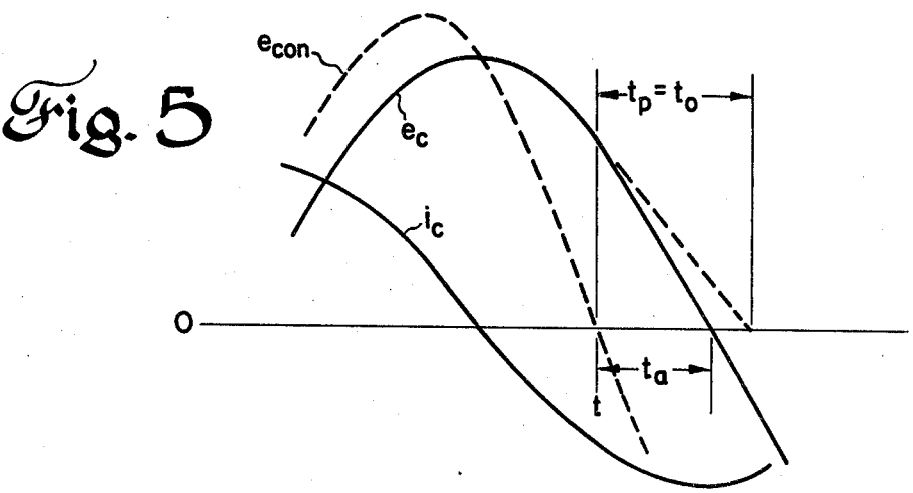
FIG. 5 is a waveform diagram of the commutating capacitor current and voltage and of the control signal, and is used in conjunction with FIG. 4 to explain the principles of the constant turn-off time computation circuit.

The single phase, full bridge, solid state inverter shown in FIG. 1 has a parallel resonant commutation circuit and preferably is operated at a variable, high frequency. The full bridge configuration implemented with silicon controlled rectifiers, or these thyristors and power diodes, are the embodiments used to explain the principles of the invention, although it is broadly applicable to other parallel capacitor commutated inverter configurations including in particular the half bridge arrangement. Similarly, the inverters and converters of this general type can be constructed with other controlled power devices and controlled rectifiers including the mercury arc rectifier and ignitron. As was mentioned, these inverters have utility in induction heating and other high frequency applications where the precise frequency is not critical. The power converter systems with an intermediate tuned parallel resonant commutation circuit described in Bedford U.S. Pat. No. 3,742,336 are implemented both as a cycloinverter system, with an input inverter as herein taught and an output cycloconverter, and as a high frequency link cycloconverter system with both input and output cycloconverters. A number of the possible variations, which will not be further explained here, are discussed in the Bedford patent. The present invention has utility in deriving firing limit signals or as a control circuit subcombination for the cycloconverters in these systems. The modifications of the basic control circuit and method that are required for these cycloconverters are given in the previously identified concurrently filed application, Ser. No. 419,490 by the same inventor. For further general information on cycloconverter control circuits, reference may be made to the book by the inventor entitled "The Theory and Design of Cycloconverters," MIT Press, Cambridge, Mass., copyright 1972.

Referring to FIG. 1, the inverter has a pair of input terminals 11 and 12 between which is applied a relatively constant unidirectional voltage $E_d$ supplied by a battery or a rectifier and filter connected to an alternating current source. A pair of chokes or filter inductors 13 and 14 are respectively connected between the input terminals and the full bridge arrangement of a pair of series connected main thyristors S1 and S2' and a parallel pair of series connected main thyristors S2 and S1'. The parallel resonant commutation circuit comprised by the parallel commutating capacitor 15 and commutating inductor 16 is connected between the junctions of the respective pairs of main thyristors. Thyristors S1 and S1' conduct together, and commutation is initiated by firing S2 and S2' in the alternate half cycles whereby the commutating capacitor voltage provides a reverse anode-cathode voltage for turning off the then conducting thyristors. Similarly, as in the ordinary parallel capacitor commutated inverter, commutation of the conducting thyristors S2 and S2' is initiated by turning on the other pair S1 and S1'. The primary winding of the load or coupling transformer 17 is connected in parallel with the capacitor 15 and inductor 16, and by way of example has a center-tapped secondary winding connected to a polyphase output cycloconverter for supplying variable frequency and voltage to a load. The inverter is ordinarily operated at a high frequency, about 1,000 to 4,000 Hz, and the operating frequency is usually above the resonant frequency of the commutation circuit. At resonance, the commutating capacitor and inductor would have equal but opposite reactive power so that none would be available for the load. At twice the resonant frequency, the capacitor power is doubled, while the inductor power is halved, so that three-quarters of the reactive power of the capacitor is available for correcting the lagging reactive power of the cycloconverter, and providing commutating energy and turn-off time for thyristors in the inverter and also in the cycloconverter. Theoretically, when the load has a leading power factor, the operating frequency drops below the resonant frequency of the commutation circuit. The feedback thyristors S3 and S3', respectively connected across the main thyristors S1 and S1', and the other pair of feedback thyristors S4 and S4' respectively connected across the main thyristors S2 and S2', are provided for regenerative loads and can be controlled under certain conditions to reduce and eliminate any circulating current. The feedback thyristors are necessary when the converter is to be operated directly from an a-c source in the fashion of a cycloconverter. The commutating inductance can be provided by the coupling transformer 17 by using an air core or gapped iron core to provide sufficient inductance in the primary circuit.

In accordance with the invention, the control means and control method for controlling the converter with a parallel resonant commutation circuit employs sensing devices for obtaining appropriate data as to the instantaneous state of the power circuit in each half cycle, and a constant turn-off time computation circuit or analog computer for determining the time at which the next set of thyristors or other controlled power devices are to be rendered conductive. The basic objective is to provide constant turn-off time for the controlled power devices. The method of control senses the present state of the power circuit and extrapolates to project the future state assuming that the next set of thyristors is to be fired at the present time. The incoming thyristors are actually fired when the time of capacitor voltage reversal, measured from the present instant, is predicted to equal the turn-off time of the outgoing thyristors plus some safety margin. Thus, the thyristors are fired at the last safe moment, thereby minimizing the reactive power required for commutation. The effect of the operation of the constant turn-off time control means is that the operating frequency is automatically adjusted so that the thyristor turn-off time remains constant. With no unnecessary reactive power the efficiency of the converter is optimum and the voltage on the power circuit components is minimized. Since the control means operates instantaneously in each half cycle, the response of the converter is fast so that wide fluctuations in the output voltage are avoided as well as thyristor commutation failure. Severe voltage transients due to a variety of causes are accommodated without causing failure of this circuit.

The schematic commutating capacitor voltage waveforms for a half cycle of operation under different load conditions shown in FIG. 2 illustrates in a simplistic form the automatic adjustment of the operating frequency using the constant turn-off time control technique. The waveform of the capacitor voltage $e_c$ is approximately but not exactly sinusoidal. Under heavy load conditions the commutating capacitor discharges more rapidly, while under lighter load conditions, the discharge time becomes longer and less commutating energy is required by the lkoad and the converter. Under heavy, intermediate, and light load conditions, the turn-off time $t_o$ for the thyristors remains constant, although the magnitude of the capacitor voltage at which the next thyristor or set of thyristors is fired is higher for the heavy load situation and becomes progressively lower as the load decreases. The circuit turn-off time presented to the controlled power device being commutated terminates, of course, when the capacitor voltage passes through zero and its polarity reverses. At this point reverse voltage is not applied to the device being commutated and it must have regained its blocking ability by this time. In the case of a silicon controlled rectifier, the required turn-off time varies with things such as the junction temperature, thke peak forward current and the reverse voltage applied to the device. These are discussed for example in the General Electric SCR Manual, 5th Edition (copyright 1972) pp. 124-127. As there defined, the turn-off time referred to here is the circuit turn-off time, i.e., the turn-off time that the circuit presents to the SCR. In a particular power circuit using a particular device, the worst case is ordinarily used plus some safety margin, but this is a time, such as 10 microseconds, that can be readily determined.

Preferably, the sensing devices for continuously sensing appropriate parameters of the power circuit include a simple potential transformer having a primary winding connected across commutating capacitor 15 for obtaining the capacitor voltage signal $e_c$, and a simple current transformer 19 connected in series with the commutating capacitor 15 for obtaining a capacitor current $i_c$. In practice, additional power currents are needed or another set or power currents is used as will be explained. The instantaneous capacitor voltage voltage signal $e_c$ and the instantaneous capacitor current signal $i_c$ and/or other current signals are supplied as input data to the constant turn-off time computation circuit 20, which is in effect an analog computer. The output pulse or signal derived by computation circuit 20 is fed to a firing circuit 21 to generate the firing signals for rendering conductive the appropriate pair of thyristors as indicated. Firing or gating circuit 21 is a conventional circuit as described, for example, in the previously mentioned General Electric SCR Manual, and may be provided as an integral part of the constant turn-off time computation circuitry 20. Although other power circuit parameters may be sensed to effectively obtain the instantaneous capacitor voltage and current, it is preferred of course to measure these as directly as possible.

A specific example of the practice of the invention is described in detail with reference to the single phase, full bridge inverter of FIG. 3, which is the preferred embodiment although it is understood that another inverter or converter circuit configuration may be more suitable for a particular application. The power circuit of the FIG. 3 inverter is similar to FIG. 1, with the exception that power feedback diodes D1, D1', D2, and D2' are substituted for the feedback thyristors in FIG. 1. The load for the inverter is the load resistance R connected in parallel with the resonant L-C commutation circuit. This power circuit can be used for high frequency induction heating with the difference that as the load changes it is desirable to provide unity power factor to the changed load by adjusting the operating frequency of the inverter to the new value of the resonant frequency. The power inverter of FIG. 3 can also be used as the input iknverter inverter the high frequency link cycloinverter system. A mathematical analysis, using as a starting point the differential equation for the commutating capacitor voltage, is used in the derivation of the sensing device arrangement and construction of the analog computer, as well as the generation of the control signal $e_{con}$ used to indicate the time of firing of the next set of thyristors in order to obtain constant turnoff time. Therefore, the symbols used in the equations are shown in FIG. 3, rather than the usual numerical designation of the components. The feedback rectifier diodes are necessary when the load is regenerative, and they also prevent excessive buildup of voltage across the parallel resonant commutation circuit when the load is light and the discontinuous current mode of operation prevails. The input filter inductors are assumed to be uncoupled and each divided into a forward or direct filter inductor havikng a value $L_d/2$ and a current $i_d$, and a feedback filter inductor having a value $L_f/2$ and a current $i_f$. The supply current is then $i_d-i_f$. When the two parts of the forward filter inductor whose total value is $L_d$ is designed as a swinging choke, it may be possible to reduce the current where transition between the continuous and discontinuous modes occurs to a sufficiently low level, e.g., the current to supply the no-load losses, such that the feedback diodes can be omitted for non-regenerative loads. The two pairs of series-connected feedback diodes are respectively coupled between the terminals of the feedback filter inductors, while the two pairs of series-connected main thyristors are coupled between the terminals of the forward filter inductors. An autotransformer T is connected in parallel with the L-C commutation circuit, where $n$ is the ratio of the number of turns between taps to the total number of turns, and the taps are respectively connected to the junction of the feedback diodes D1 and D2' and the junction of the feedback diodes D2 and D1'. The voltage between the taps consequently has the value $ne_c$ with the polarity as indicated. When the peak capacitor voltage rises too high above the d-c supply voltage, the feedback diodes become conductive and partially discharge the commutating capacitor. Under some conditions, as is known in the art, it is possible for all four feedback diodes to conduct, in which case the load voltage is clamped to zero. Preferably a small series current-limiting commutating inductor $L_c$ is provided to limit the $di/dt$ in the main thyristors, and is suitably connected between one terminal of the L-C commutation circuit and the junction of the thyristors S2 and S1'. Similarly, there is a series current-limiting feedback commutating inductor $L_{cf}$ coupled between the adjacent tap of the autotransformer T and the junction of feedback diodes D2 and D1'. If not provided as a separate component, this inductance is present because of the leakage reactance of the autotransformer T.

For this power converter configuration, the preferred arrangement of the sensing devices for the constant turn-off time control means is as illustrated. The small potential transformer 18 continuously senses the commutating capacitor voltage $e_c$, and a unity turns ratio is assumed with the polarity convention as shown by the dots. The current transformer 19' has two one-turn primary windings and a secondary winding of N turns, the polarity convention being as indicated by the dots. One of the primary turns senses $i_d$ and is connected directly between the junction of main thyristors S1 and S2' and the junction of the L-C commutating circuit components, while the other primary winding senses $ni_f + i_L + i_R$ and is connected in series between one terminal of the commutating capacitor C and the adjacent terminal of the commutating inductor L, autotransformer T, and load resistance R. The secondary winding is connected across a computation circuit burden resistor 22, also identified as $NR_r$, which in turn is connected in series with the secondary winding of the potential transformer 18. The control signal $e_{con}$ comprised by the addition of the voltage across burden resistor 22 and the voltage across the secondary winding of the potential transformer 18 is referenced to ground and compared with a zero voltage level using an integrated circuit comparator 23 or a differential amplifier. The constant turn-off time computation circuit can include other components, such as a delay circuit and inhibit circuit, as will be further explained. The generation of an output signal from the comparator 23 indicates that the next set of thyristors are to be fired, in order to obtain a constant turn-off time for the presently conducting devices. The reasons for the arrangement of the sensing devices and computation circuit as shown in FIG. 3 can only be explained by the following mathematical analysis, and the reason for firing the next set of thyristors when the control signal $e_{con}$ passes through zero is also a mathematically derived concept.

The development of the equation for the control signal $e_{con}$, which goes through a zero value in advance of the commutating capacitor instantaneous voltage zero at an interval equal to the constant turn-off time for commutation, uses a derivation that starts at a simplification and then proceeds to the actual power circuit without, and then with, the series curent-limiting $L_c$ and $L_{cf}$ that ussually are required in practice. These equations determine the sensing device and computation circuit configurations, which will be shown to have the basic form illustrated in FIG. 3. For the power circuit with the series current-limiting inductors, the value of the burden resistor $R_r$ is different than for the case of a power circuit without these components, but otherwise the constant turn-off time control means can be the same. Assuming negligible or zero $L_c$ and the proper polarity of the capacitor voltage $e_c$, the current $i_d$ commutates from thyristors S1 and S1' to thyristors S2 and S2' as soon as the latter pair is fired, and vice versa. Similarly, assuming zero $L_{cf}$, the feedback current $i_f$ commutates instantaneously from diodes D1 and D1' to diodes D2 and D2' when the capacitor voltage $e_c$ crosses zero going negative, and the former pair of diodes conduct when the capacitor voltage reverses again. The state of the power semiconductor devices can then be described by switching functions S and $S_f$ as follows:

S = +1 when S1 and S1' are conducting
S = −1 when S2 and S2' are conducting
$S_f$ = +1 when D1 and D1' are conducting
$S_f$ = −1 when D2 and D2' are conducting Unless a commutation failure or shoot-through occurs, the two states of S are mutually exclusive for instantaneous commutation ($L_c = 0$). The two states of $S_f$ are not necessarily mutually exclusive since it is possible for all four diodes to conduct under certain conditions. But, since the thyristors must be fired before the capacitor voltage reaches zero, and only one set of diodes can possibly be conducting when the capacitor voltage is not zero, the states of $S_f$ can be considered to be mutually exclusive at this time of interest.

The control circuit, as was stated, senses the present state of the power circuit and extrapolates to predict the future state with the assumption that the next set of thyristors is fired at the present time. The method of prediction is similar to the numerical solution of the differential equation for the capacitor voltage by the simple Euler method. Euler's method, and also the second order Runge-Kutta method, are described for example in the book "Introduction to Numerical Methods and FORTRAN Programming" by T.R. McCalla, John Wiley and Sons, Inc., copyright 1967, pages 307-310. Euler's method is the simplest of all algorithms for solving ordinary differential equations. FIG. 4 is a simplified drawing of the sensing device and computation circuit or analog computer of FIG. 3. For this arrangement the numerical value of $e_{con}$ is $e_c + i_c R_r$, where the turns ratio of both the current and potential transformers is unity for simplicity. The circuit waveforms for $e_c$, $i_c$, and $e_{con}$ are shown in FIG. 5. The differential equation for the capacitor voltage $e_c$ is $$(de_c/dt) = (i_c/C). \qquad (1)$$

By projecting the slope as given by equation (1) at the time instant $t$ (FIG. 5) to intersect the zero voltage axis, the predicted time $t_p$ remaining to voltage zero is given by $$t_p = -(Ce_c/i_c). \tag{2}$$

Rearranging (2), $$0 = e_c + (t_p/C)i_c. \tag{3}$$

From (3) it is seen that if the burden resistor $R_x$ is selected to have the value $R_x = t_o/C$, where $t_o$ is the turn-off time made available for the outgoing thyristors ($t_o = t_p$), then $$e_{con} = e_c + R_x i_c = e_c + (t_o/C) i_c, \tag{4}$$

and the zero-crossing of this signal is the instant when the incoming thyristors are to be fired so that $t_p = t_o$ is satisfied. The difference between $t_p$ and the actual time $t_a$ to voltage zero is the error inherent in the simple Euler method, and can be reduced by using a second-order method of numerical prediction that includes in the equations the derivative $di_c/dt$ of the capacitor current. Such an improvement is easily incorporated in practice by making the current transformer burden suitably reactive.

This simple approach is not usable in the present situation where the commutating capacitor and load are driven by the inverter, since the act of firing the incoming thyristors changes the capacitor current. It is important to note that in computing when to fire the incoming thyristors, it is the capacitor current after firing that is used in the equations. Denote the present state of the thyristor switching variable $S$ by $S_1$. Then (see FIG. 3) the present capacitor current is $$i_c = S_1 i_d - (S_f n i_f + i_L + i_R). \tag{5}$$

By firing the incoming thyristors at this instant, the value of $S$ reverses and the capacitor current changes to $$i_c' = -(S_1 i_d + S_f n i_f + i_L + i_R). \tag{6}$$

The value of (6) must be used in equations (2) and (3) to calculate when the capacitor voltage reverses after the thyristors are fired. Thus, the control signal becomes $$e_{con} = e_c - R_x(S i_d + S_f n i_f + i_L + i_R). \tag{7}$$

Note that the change in capacitor is in the direction that accelerates discharge after firing the incoming thyristors, so that the projection according to equation (2) would result in insufficient turn-off time. Since the contribution of the feedback current to capacitor discharge does not change until after $e_c$ has crossed zero, the present state of the switching function $S_f$ is correct for computing the firing time.

Figure 8:
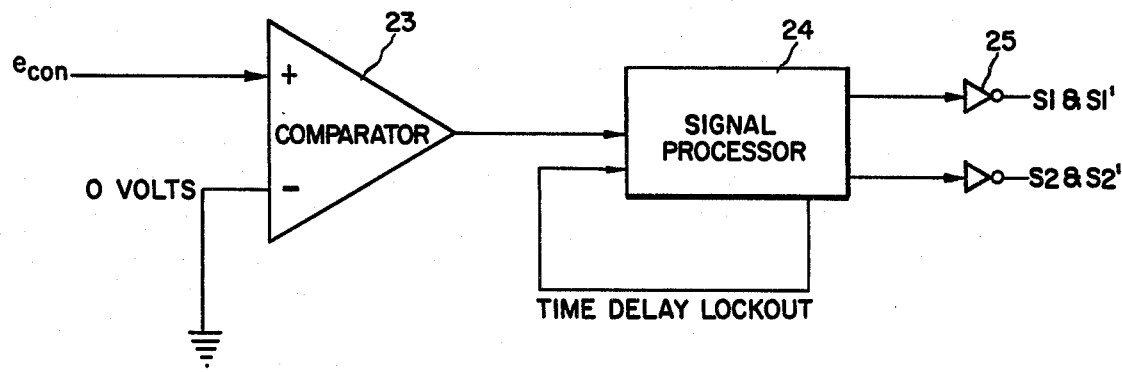
FIG. 8 is a simplified block diagram illustrating the additions to the computation circuit as shown in FIG. 3 to block the production of spurious output signals due to multiple zero-crossings of the control signal.

The control signal $e_{con}$ as defined by equation (7) is provided by the sensing device arrangement shown in FIG. 3. It is recalled that the potential transformer 18 has a unity turns ratio, while the current transformer 19' has two one-turn primary windings and an N turn secondary winding. For the half cycle in which $e_c > 0$, S2 and S2' are the incoming thyristors, and the circuit operation is illustrated by the waveforms in FIG. 6. Because $L_c$ and $L_{cf}$ have been assumed to be zero, the negative-going capacitor current $i_c$ at the firing time $t$ drops by twice the absolute value of the direct (thyristor) current $i_d$, remains approximately constant during the actual turn-off time $t_a$, and then rises by twice the absolute value of the feedback current $i_f$ after blocking of the outgoing thyristors is achieved. The control signal $e_{con}$ passes through zero (see A) at the firing time $t$, then goes positive again, and passes through another zero at B before becoming negative. The second zero-crossing B is a spurious crossing. This and any other spurious zero-crossing is ignored, as by using the modifications and additions to the computation circuitry shown in FIG. 8. Using the comparator 23 in FIG. 3, the signal $e_{con}$ is compared with a zero reference voltage level, and the generation of an output signal at time $t(=A)$ causes the firing circuit (FIG. 1) to supply firing or gating signals to the appropriate set of thyristors. The turn-off time $t_o$ is approximately equal to $t_a$ in FIG. 6.

The inclusion of the small series current-limiting commutating inductors $L_c$ and $L_{cf}$ to limit the $di/dt$ in the thyristors modifies the commutation process and allows an overlap interval $t_u$ in which all four thyristors conduct. Instead of having an almost instantaneous change as in FIG. 6, the current $I_d$ transfers from the outgoing to the incoming thyristors at a rate $di/dt = e_c/L_c$ (see bottom of FIG. 7). Thus in FIG. 7 the drop in the current $i_c$ equal to twice the magnitude of the direct current during the overlap interval, $I_d$, takes place over the overlap interval $t_u$. Since reverse voltage is not applied to the outgoing devices until the completion of the transfer process, the firing of the incoming devices is advanced to allow for the time $t_u$ in addition to the turn-off time $t_o$ before the capacitor voltage reverses. The following analysis shows that the compensation for overlap due to the inclusion of $L_c$ and $L_{cf}$ is easily accomplished by increasing the value of the current transformer burden resistor $R_x$.

Figure 7:
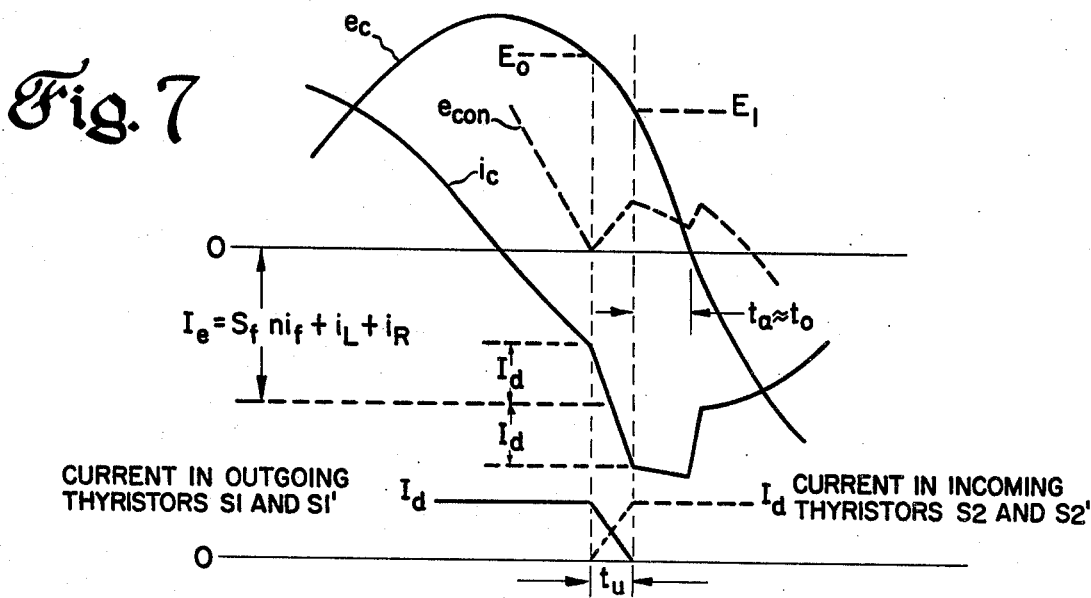
FIG. 7 is a waveform diagram similar to FIG. 6 for the power circuit with the series inductors $L_c$ and $L_{cf}$ to limit $di/dt$ during commutation so that there is an overlap in conduction of the sets of thyristors.

Assume that the currents $i_d$, $i_f$, $i_L$, and $i_R$ remain approximately constant throughout the overlap interval $t_u$. As indicated in FIG. 7, let $i_d$ have the value $I_d$ during this interval and let the sum of the other currents that discharge the commutating capacitor have the value $$I_c = (S_f n i_f + i_L + i_R). \tag{8}$$

When $e_c$ is positive, $I_c$ is negative and reduces the capacitor voltage during this interval. The current in series commutating inductor $L_c$ is initially $+I_d$ and finally $-I_d$, and the average value is therefore zero as is the charge removed from or placed onto capacitor C from this source. Consequently, the change in capacitor voltage from an initial value $E_0$ to a final value $E_1$ during the interval $t_u$ (see FIG. 7) is given by $$E_1 = E_0 - (I_d/C)t_u. \tag{9}$$

The average capacitor voltage during the overlap interval is $(E_0 + E_1)/2$. This average voltage forces the previously mentioned current change of $2I_d$ in the series commutating inductor $L_c$. The process satisfies the relation $$2I_d = (E_0 + E_1/2)(t_u/L_c). \tag{10}$$

Substituting $E_1$ from equation (9) and (10) and simplifying, $$(I_c/2C) t_u^2 - E_0 t_u + 2L_c I_d = 0. \tag{11}$$

Solving the quadratic (11) for $t_u$, $$t_u = E_0 - \sqrt{E_0^2 - 4L_c I_d I_c/C}/I_c/C. \tag{12}$$

Substituting this value of $t_u$ into (9), $$E_1 = \sqrt{E_0^2 - 4L_c I_d I_c/C}. \tag{13}$$

The predicted value $E_1$ of $e_c$ at the end of the overlap interval, given by (13), should be used in equation (7) instead of the value $E_0$ at the time of firing. However, $E_0$ is the value measured by potential transformer 18 at the time of firing and the modified equation for $e_{con}$ must be expressed in terms of $E_0$, the currents and constant factors. A simple approximate expression is derived as follows.

The proper time to fire the incoming thyristors is determined by effectively solving the equation $$e_{con} = 0 = E_1 - (t_o/C)(I_d + I_c) \tag{14}$$

or $$E_1^2 = [(t_o/C)(I_d + I_c)]^2 \tag{15}$$

From (13) and (15), $E_1$ can be eliminated and the expression written as $$E_0^2 = [(t_o/C)(I_c + I_d)]^2 [1 + (4CL_c/t_o^2) \cdot (I_d I_c)/(I_c + I_d)^2]. \tag{16}$$

The maximum value of the term $I_d I_c/(I_c + I_d)^2$ is ¼, occurring when $I_c = I_d$. Hence, for this worst case, the firing condition should be $$E_0 = (t_o/C)(I_c + I_d) \sqrt{1 + (CL_c^2/t_o)}. \tag{17}$$

Reverting to the instantaneous voltage and current values as measured by the potential transformer 18 and current transformer 19' in FIG. 3, the desired thyristor firing condition becomes $$e_{con} = e_c - (t_o/C \sqrt{1+(CL_c^2/t_o^2)})(Si_d + S_f n i_f + i_L + i_R)$$
$$= 0 \text{ at time of firing.} \tag{18}$$

It is seen that the proper value of the burden resistor $R_r$ to include allowance for overlap is $R_r = (t_o/C) \sqrt{1 + (CL_c^2/t_o^2)}$. \tag{19}$ Thus, compensation for the overlap does not require complex analog computation circuitry, as would be required for the solution of equation (14) using (13) for $E_1$.

Figure 6:
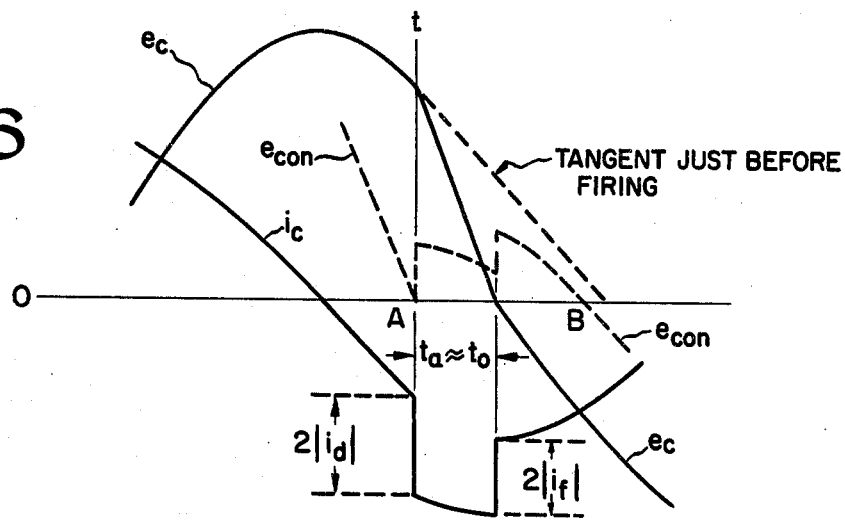
FIG. 6 is a waveform diagram similar to FIG. 5 and is used to explain the actual technique for computing capacitor voltage zeros for the power and control circuit of FIG. 3, assuming that the series commutating inductors $L_c$ and $L_{cf}$ are not present (although normally these are required)

As was previously mentioned and as is evident in FIGS. 6 and 7, the control signal $e_{con}$ has spurious zero-crossings or near zero-crossings closely following the initial zero-crossing that is the valid output signal. Accordingly, additional circuitry at the output of the comparator 23, to effectively inhibit the comparator for a short interval following recognition of the first zero-crossing, is needed in a practical control circuit. This is illustrated in block diagram form in FIG. 8, wherein the signal processor 24 is provided with a time delay lockout feature that is activated by the first output pulse from the comparator. For instance, the signal processor can include a pair of one-shot multivibrators with logic to actuate the one-shots alternately. By making the output pulse duration of the one shots at least equal to the selected lockout delay time, the desired result is achieved. The gate driver amplifiers 25 energized alternately by the signal processor 24 can produce a series of closely spaced firing pulses for thyristors S1 and S1' and the thyristors S2 and S2', as is sometimes needed for regenerative loads.

To start the inverter, the load should be minimized, and in fact it is believed that there is some load beyond which starting, if it is accomplished at all, requires auxiliary starting components or a special procedure. When the load is an output cycloconverter, the cycloconverter thyristors are temporarily blocked to unload the inverter. After raising the d-c voltage with the inverter thyristors nonconductive, a single firing pulse applied to one set of thyristors initiates oscillation of the parallel resonant commutation circuit. Subsequent firing of the thyristors is then controlled as herein taught.

The constant turn-off time computation circuit and control technique using first-order Euler method equations gives an accurate approximation of the precise or actual turn-off time. By way of verification, the turn-off time calculated according to a fourth-order Runge-Kutta method is close to the predicted turn-off time according to the first-order Euler method. Using the new control method, errors arise only if the load current changes significantly during the thyristor turn-off time, typically an interval of 10–100 microseconds that occupies a small fraction of each cycle. Accordingly, the safety factor can be small and the best possible performance is achieved at all frequencies. In an actual circuit, the turn-off time that is maintained is not exactly constant but can easily vary by 30 percent, for example, although in absolute time this can be only a few microseconds or tens of microseconds. As compared to the total length of the half cycle of the output voltage, the turn-off time provided as here disclosed is relatively constant.

Figure 9:
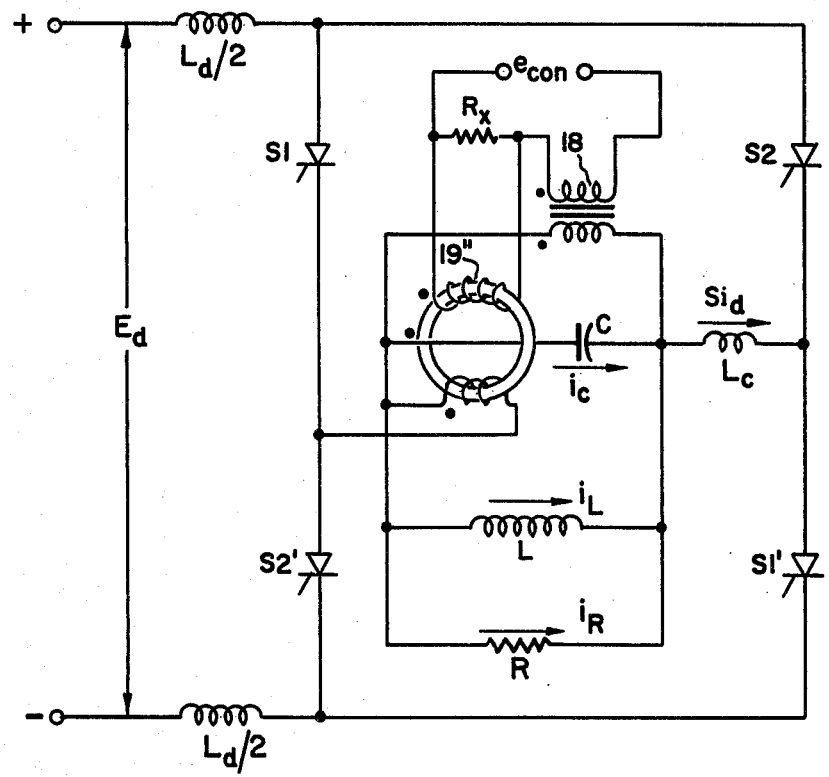
FIG. 9 is a schematic circuit diagram of the inverter with the feedback diodes and associated circuitry omitted, illustrating a different configuration of the sensing devices and circuitry for obtaining the control signal.

Other configurations of the sensing devices, in particular the potential and current transformers, are possible. The bridge inverter shown in FIG. 9 is similar to that of FIG. 3 except that the feedback diodes and associated circuitry are omitted. For some loads the use of the feedback diodes is not essential. An alternative expression for the control signal as set forth in equation (7), obtained by algebraic manipulation, is as follows:

$$e_{con} = e_c + R_r(i_c - 2Si_d)$$

(7a)

To implement this computation the potential transformer is the same, but the current transformer now has a one-turn primary winding for the capacitor current $i_c$ and a two-run primary winding for the direct current or thyristor current $Si_d$. Still other equivalent computations are possible, all using a potential transformer and one or more than one current transformer as the sensing devices.

In summary, a constant turn-off time control circuit for a variable operating frequency inverter or other converter with a parallel resonant commutation circuit automatically adjusts the frequency so that the reactive power for commutation is optimum. Moreover, power circuit reliability is improved. The control circuit and control method have a fast response time, such as is needed to accommodate starting and other severe transients, and in situations where the load impedance changes rapidly. Proper control is needed to avoid wide fluctuations in the output voltage and to ensure against thyristor commutation failure. With the constant turn-off control, the efficiency of the power converter is optimun and voltage stresses on the circuit components are minimized. Examples of the sensing device configurations and of the computation circuitry that determine the timing of the firing signals for the thyristors or other controlled power devices have been given, although still others are possible. These converters are suitable for induction heating as well as the high frequency link cycloinverter systems.

While the invention has been particularly shown and described with reference to several preferred embodiments thereof, it will be understood by those skilled in the art that various changes in form and details may be made therein without departing from the spirit and scope of the invention.

What is claimed is:

1. An efficient power converter for converting an input voltage to a different frequency output voltage comprising
    a power converter circuit having a plurality of controlled power devices that are sequentially rendered conductive at a variable frequency,
    a parallel resonant commutation circuit including commutating inductance means and parallel commutating capacitor means for supplying a variable amount of reactive power to render said controlled power devices nonconductive, and
    constant turn-off time control means for computing the timing of firing signals to provide an approximately constant turn-off time for said controlled power devices, to thereby adjust the operating frequency, wherein
    said constant turn-off time control means comprises sensing means for sensing selected instantaneous power circuit parameters and analog computation circuit means for cyclically and instantaneously deriving an output signal for timing said firing signals,
    said sensing means and computation circuit means being operative to produce said output signal when the predicted time to passage through zero of the voltage of said commutating capacitor means after the firing of each incoming controlled power device is approximately equal to a predetermined constant turn-off time for a corresponding outgoing controlled power device, and
    said sensing means and computation circuit means comprises at least one potential sensing device for sensing the instantaneous voltage of said commutating capacitor means and at least one current sensing device for sensing a plurality of instantaneous power circuit currents indicative of the commutating capacitor means current after the firing of each incoming controlled power device,
    a burden resistor coupled to the outputs of said current and potential sensing devices and forming an analog circuit which generates a control signal, and
    means for comparing said control signal with a reference voltage and producing said output signal.

2. A power converter according to claim 1 wherein said control signal passes through zero in each half cycle, and
    said comparing means comprises a comparator for generating said output signal upon the passage through zero of said control signal.

3. A power converter according to claim 2 wherein said control signal has multiple zero-crossings in each half cycle, and said computation circuit means further includes
    time delay means for inhibiting the generation of spurious output signals subsequent to the output signal at the initial zero-crossing.

4. A power converter according to claim 1 wherein said potential sensing device is a potential transformer and said current sensing device is a current tansformer, and
    said burden resistor is connected between the terminals of the secondary winding of said current transformer and in series with the secondary winding of said potential transformer to thereby generate said control signal.

5. A power converter according to claim 4 wherein said comparing means comprises a comparator for generating said output signal upon the initial zero-crossing of said control signal in each half cycle, and
    time delay means for inhibiting the generation of spurious output signals at subsequent zero-crossings of said control signal during a predetermined interval following the initial zero-crossing.

6. An efficient inverter for converting a supply voltage to a high frequency output voltage comprising
    a power inverter circuit having at least a pair of thyristor devices that are alternately rendered conductive at a variable frequency,
    a parallel resonant commutation circuit including commutating inductance means and a parallel commutating capacitor for supplying a variable amount of reactive power to alternately render said thyristor devices nonconductive, and
    constant turn-off time control means comprising sensing means for sensing selected instantaneous power circuit parameters, and further comprising analog computation means for deriving on an instantaneous basis an output signal timed to produce a firing signal for an incoming thyristor device that results in an approximately constant turn-off time for an outgoing thyristor device, to thereby automatically adjust the inverter operating frequency, wherein
    said sensing means includes a potential sensing device for the commutating capacitor voltage and at least one current sensing device for sensing a plurality of power circuit currents indicative of the commutating capacitor current after the firing of said incoming thyristor device.

7. An inverter according to claim 6 wherein the output of said current sensing device is applied across a burden resistor, and said burden resistor is connected in series with the output of said potential sensing device to continuously generate a cyclically varying control signal.

8. An inverter according to claim 7 wherein said power inverter circuit further includes series current-limiting commutating inductance means, and the value of said burden resistor is adjusted to compensate for the resulting overlap in conduction of the incoming and outgoing thyristor device.

9. An inverter according to claim 7 wherein said computation means includes means for comparing said control signal with a reference voltage and deriving said output signal at the initial zero-crossing in each half cycle.

10. An inverter according to claim 9 wherein said computation means further includes time delay means for inhibiting the generation of spurious output signals at subsequent zero-crossings of said control signal during a predetermined interval following the initial zero-crossing.

11. An inverter according to claim 6 wherein said current sensing device is connected to sense the commutating capacitor current and the current through said thyristor devices.

12. An efficient inverter for converting a supply voltage to a high frequency output voltage comprising a power inverter circuit having at least a pair of thyristor devices that are alternately rendered conductive at a variable frequency, a parallel resonant commutation circuit including commutating inductance means and a parallel commutating capacitor for supplying a variable amount of reactive power to alternately render said thyristor devices nonconductive, and constant turn-off time control means comprising sensing means for sensing selected instantaneous power circuit parameters, and further comprising computation means for deriving an output signal timed to produce a firing signal for an incoming thyristor device that results in an approximately constant turn-off time for an outgoing thyristor device, to thereby automatically adjust the inverter operating frequency, wherein said sensing means includes a potential sensing device for the commutating capacitor voltage and at least one current sensing device for power circuit currents indicative of the commutating capacitor current after the firing of said incoming thyristor device, said power inverter circuit further includes a feedback power device associated with each thyristor device and connected to return feedback currents to the supply, and said current sensing device is connected to sense the current through said thyristor devices, the feedback current, the current through said commutating inductance means, and the load current.

13. An inverter according to claim 12 wherein said potential sensing device is a potential transformer and said current sensing device is a current transformer, and said computation means includes a burden resistor connected between the terminals of the secondary winding of said current transformer, said burden resistor further being in series with the secondary winding of said potential transformer to thereby generate a cyclically varying control signal, and means for comparing said control signal with a reference signal and producing said output signal at the initial zero-crossing of said control signal in each half cycle.

14. An inverter according to claim 13 wherein said power inverter circuit includes series current-limiting commutating inductance means, and the value of said burden resistor is adjusted to compensate for the resulting overlap in conduction of the incoming and outgoing thyristor device.

15. An inverter according to claim 14 wherein said computation means further includes time delay means for inhibiting the generation of spurious output signals at subsequent zero-crossings of said control signal during a predetermined time interval following the initial zero-crossing.

16. The method of controlling a power converter circuit having a plurality of controlled power devices that are sequentially rendered conductive at a variable frequency to convert an input voltage to a different frequency output voltage, and a parallel resonant commutation circuit including commutating inductance means and parallel commutating capacitor means for supplying a variable amount of reactive power to render said controlled power devices nonconductive, said method comprising the steps of sensing selected instantaneous power circuit parameters, including the commutating capacitor means voltage and a plurality of power circuit currents, from which the future state of said parallel commutating capacitor means can be predicted, computing from the sensed parameters on an instantaneous basis the timing of firing signals for said controlled power devices to provide an approximately constant turn-off time thereof, and supplying timed firing signals to said controlled power devices to automatically adjust the converter operating frequency.

17. The control method according to claim 16 wherein the step of computing the timing of firing signals comprises continuously deriving from the sensed power circuit parameters a cyclically varying control signal, and comparing said control signal with a reference.

18. The control method according to claim 17 wherein said control signal has multiple zero-crossings in each half cycle, and the comparing step includes generating an output signal upon the initial passage through zero of said control signal, inhibiting the production of spurious output signals at subsequent zero-crossings of said control signal during a predetermined time interval following the initial zero-crossing, and utilizing said output to derive the timed firing signal.

19. The method of controlling a power inverter circuit having at least a pair of thyristor devices that are alternately rendered conductive at a variable frequency to convert an input voltage to a different frequency output voltage, and a parallel resonant commutation circuit including commutating inductance means and a parallel commutating capacitor for supplying a variable amount of reactive power to alternately render said thyristor devices nonconductive, said method comprising the steps of continuously sensing selected instantaneous power circuit parameters from which the future state of said commutating capacitor can be predicted, computing from the sensed parameters the timing of an output signal used to generate a firing signal for an incoming thyristor device that results in an approximately constant turn-off time for an outgoing thyristor device, and supplying timed firing signals to said thyristor devices to automatically adjust the inverter operating frequency, wherein the computing step comprises deriving from the sensed power circuit parameters a cyclically varying control signal, comparing said control signal to a reference, and generating said output signal when the instantaneous value of said control signal equals the reference, further wherein said control signal has multiple values equal to the reference, and the computing step further includes inhibiting the generation of spurious output signals for a time interval in each half cycle following the generation of a valid output signal.

20. The method of controlling a power inverter circuit having at least a pair of thyristor devices that are alternately rendered conductive at a variable frequency to convert an input voltage to a different frequency output voltage, and a parallel resonant commutation circuit including commutating inductance means and a parallel commutating capacitor for supplying a variable amount of reactive power to alternately render said thyristor devices nonconductive, said method comprising the steps of continuously sensing selected instantaneous power circuit parameters from which the future state of said commutating capacitor can be predicted, computing from the sensed parameters the timing of an output signal used to generate a firing signal for an incoming thyristor device that results in an approximately constant turn-off time for an outgoing thyristor device, and supplying timed firing signals to said thyristor devices to automatically adjust the inverter operating frequency, wherein the computing step comprises deriving from the sensed power circuit parameters a cyclically varying control signal, comparing the control signal to a zero voltage reference, generating said output signal at the initial zero-crossing of said control signal in each half cycle, and inhibiting the generation of spurious output signals for a predetermined time interval.

21. An efficient power converter comprising a variable operating frequency power converter circuit having a plurality of controlled power devices that are sequentially rendered conductive at a variable frequency, a parallel resonant commutation circuit including commutating inductance means and parallel commutating capacitor means for supplying a variable amount of reactive power to render said controlled power devices nonconductive, and constant turn-off time control means for computing the timing of and generating firing signals to provide an approximately constant turn-off time for said controlled power devices at each operating frequency, said constant turn-off time control means comprising sensing means for continuously and simultaneously sensing at each instant a plurality of selected instantaneous power circuit voltage and current parameters from which the future state of said commutating capacitor means can be determined, and computation cirduit means for cyclically and continuously computing the timing of each firing signal from the sensed instantaneous voltage and current parameters at each instant.

22. An efficient power converter for converting an input voltage to a different frequency output voltage comprising a power converter circuit having a plurality of controlled power devices that are sequentially rendered conductive at a variable frequency, a parallel resonant commutation circuit including commutating inductance means and parallel commutating capacitor means for supplying a variable amount of reactive power to render said controlled power devices nonconductive, and constant turn-off time control means for deriving firing signals timed to provide an approximately constant turn-off time for said controlled power devices, to thereby adjust the operating frequency, wherein said constant turn-off time control means comprises sensing means for sensing selected instantaneous power circuit parameters and computation circuit means for cyclically deriving an output signal for timing said firing signals, said sensing means and computation circuit means comprises at least one potential sensing device for sensing the instantaneous voltage of said commutating capacitor means and at least one current sensing device for sensing at least one instantaneous power circuit current indicative of the commutating capacitor means current after the firing of each incoming controlled power device, a burden resistor coupled to the outputs of said current and potential sensing devices and forming an analog circuit which generates a control signal, and means for comparing said control signal with a reference voltage and producing said output signal, and said power converter circuit further includes series current-limiting commutating inductance means, and the value of said burden resistor is adjusted to compensate for the resulting overlap in conduction of an incoming and corresponding outgoing controlled power device.

23. An efficient power converter for converting an input voltage to a different frequency output voltage comprising a power converter circuit having a plurality of controlled power devices that are sequentially rendered conductive at a variable frequency, a parallel resonant commutation circuit including commutating inductance means and parallel commutating capacitor means for supplying a variable amount of reactive power to render said controlled power devices nonconductive, and constant turn-off time control means for computing the timing of firing signals to provide an approximately constant turn-off time for said controlled power devices, to thereby adjust the operating frequency, wherein said constant turn-off time control means comprises sensing means for sensing selected instantaneous power circuit parameters and analog computation circuit means for cyclically and instantaneously deriving an output signal for timing said firing signals, said sensing means and computation circuit means being operative to produce said output signal when the predicted time to passage through zero of the voltage of said commutating capacitor means after the firing of each incoming controlled power device is approximately equal to a predetermined constant turn-off time for corresponding outgoing controlled power device, and said sensing means comprises a potential sensing device for sensing the instantaneous commutating capacitor means voltage and at least one current sensing device for sensing a plurality of instantaneous power circuit currents indicative of the commutating capacitor means current after the firing of each incoming controlled power device.

* * * * *